United States Patent [19]

Core

[11] 4,407,113
[45] Oct. 4, 1983

[54] METHOD AND MEANS FOR WRAPPING ROUND BALES

[76] Inventor: Grant M. Core, Rte. #3, Knoxville, Iowa 50138

[21] Appl. No.: 273,468

[22] Filed: Jun. 15, 1981

[51] Int. Cl.³ ............................................. A01D 39/00
[52] U.S. Cl. .................................. 56/341; 56/DIG. 2
[58] Field of Search ............... 56/341, 342, 343, 16.4, 56/DIG. 2, 109; 100/5, 76; 242/76, 78.8, 56 R, 75.41

[56] References Cited

U.S. PATENT DOCUMENTS

| | | | |
|---|---|---|---|
| 1,369,124 | 2/1921 | Pope | 242/76 |
| 3,140,359 | 7/1964 | Rupard | 242/75.41 |
| 3,427,790 | 2/1969 | Flittie | 56/341 |
| 3,587,218 | 6/1967 | Geary | 56/343 |
| 3,894,484 | 7/1975 | Anstey et al. | 56/341 |
| 4,037,391 | 7/1977 | Mitchell et al. | 56/190 |
| 4,173,112 | 11/1979 | Meiners | 56/341 |
| 4,205,514 | 6/1980 | Wolrab | 56/341 |

FOREIGN PATENT DOCUMENTS 2705101  8/1978  Fed. Rep. of Germany ........ 56/341

Primary Examiner—Gene Mancene
Assistant Examiner—David Tarnoff
Attorney, Agent, or Firm—Zarley, McKee, Thomte, Voorhees & Sease

[57] ABSTRACT

A wrapping mechanism for use in combination with a round baling machine is disclosed wherein the baling machine has a frame, a baling chamber, and arms for supporting the roll of flexible material. An electric motor is provided on a shaft upon which the flexible material is mounted for selectively imparting rotational motion to the roll. The shaft is provided with an overriding clutch. A pulley is provided on the shaft for the roll. A belt extends around the pulley and is secured by its ends to a spring which in turn is secured to the frame of the machine to provide a drag for the shaft and the roll.

A plate means is mounted on the frame adjacent the roll to separate a layer of material as it departs from the roll. The layer of material is directed towards the baling chamber or compartment.

A wind shield plate is mounted on the frame adjacent the separated layer of material to protect the material from drafts. A cutter bar is mounted adjacent the entrance to the baling compartment. Spring means maintain the cutter bar in an inoperative position. The cutter bar may then be manually tilted to cause it to move against the layer of material to sever the same.

The method of this invention involves forming a round bale in the baling compartment of the baling machine, and then providing a roll of plastic material on the baling machine with an initial rotational surge to cause a layer of plastic material to emerge from the roll towards the baling compartment. The baling machine is then actuated to cause additional material to be baled to engage the layer of plastic material and to move the layer of plastic material into fixed contact with the bale. The bale is then rotated within the machine to cause the bale to pull additional material from the roll and to wrap the material around the periphery of the bale. The material then is cut between the bale and the roll of material. Rotational resistance is provided to the roll of plastic material to prevent it from free wheeling while the layer of material is being separated therefrom. The leading edge of the layer of material is shielded from wind currents.

8 Claims, 11 Drawing Figures

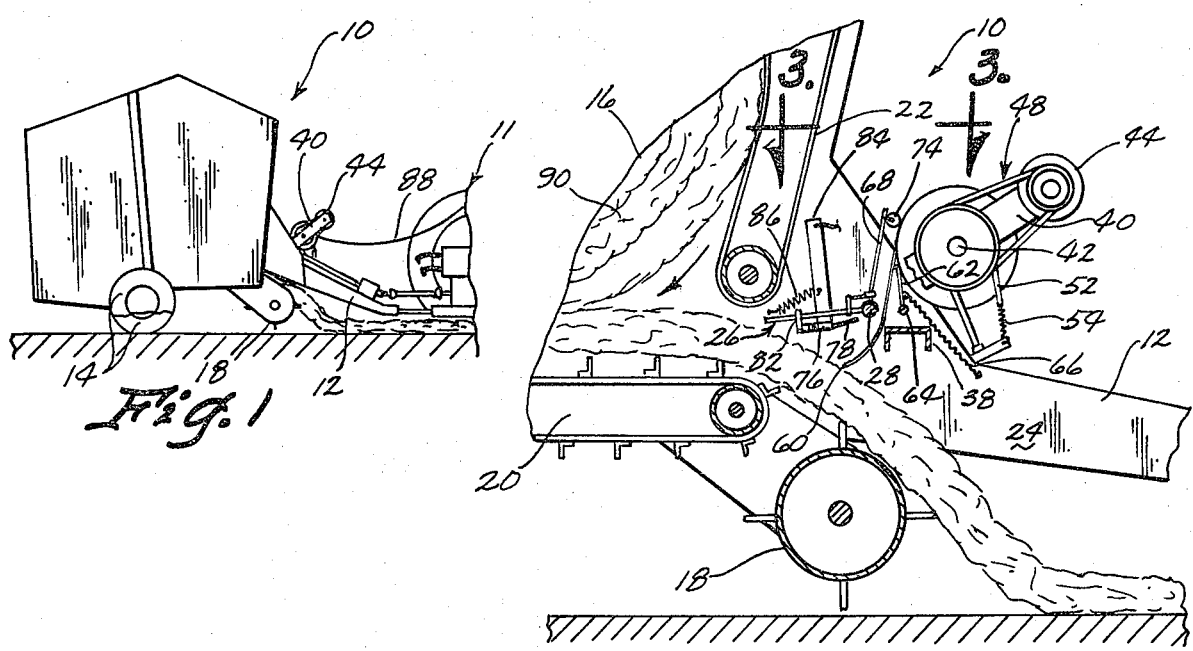
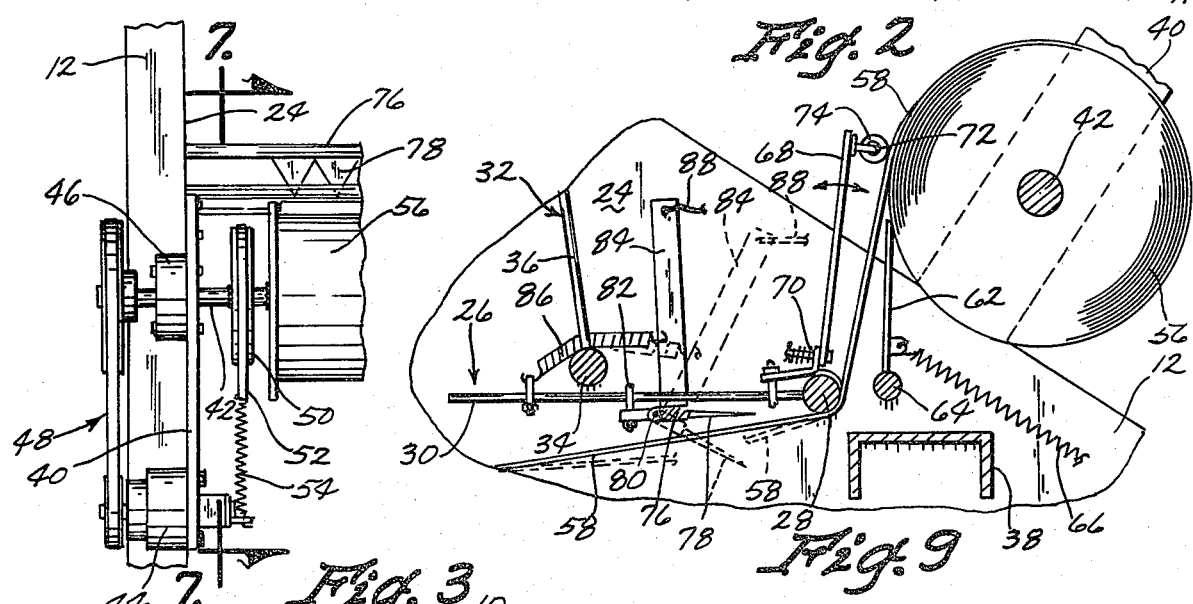
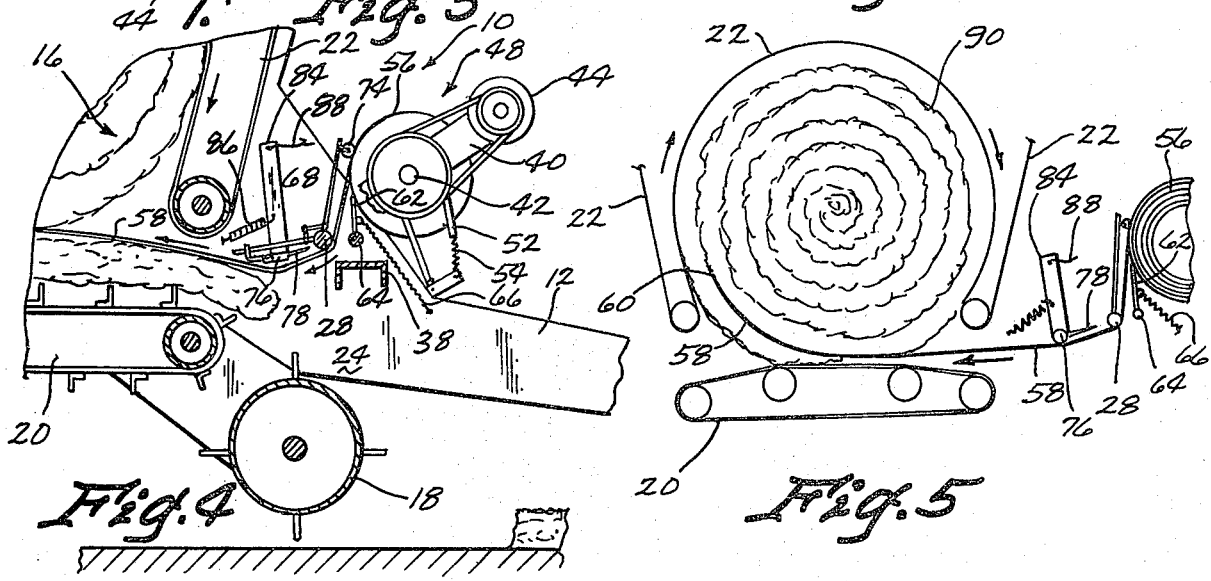

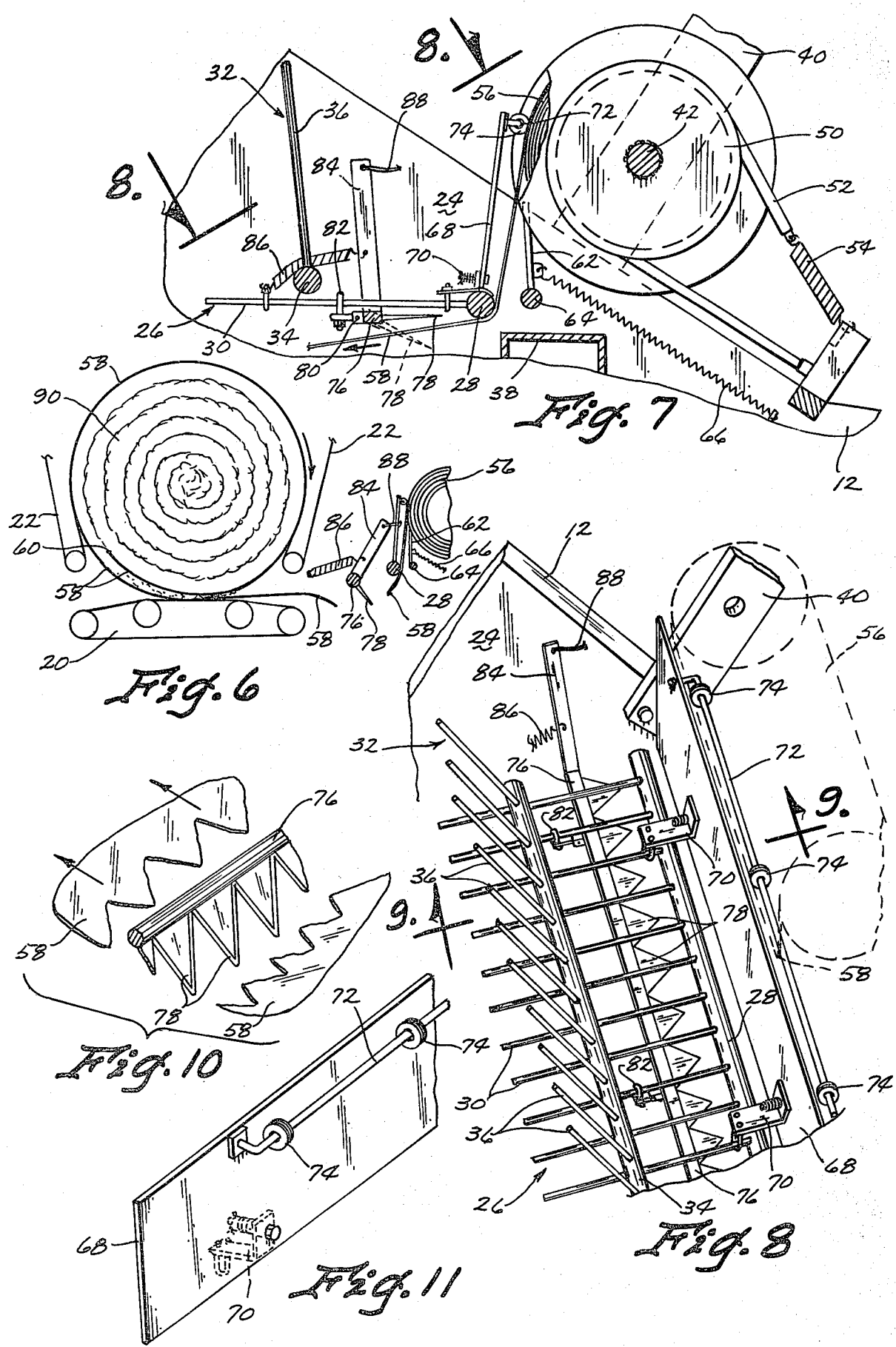

METHOD AND MEANS FOR WRAPPING ROUND BALES

BACKGROUND OF THE INVENTION

Large round bales weighing 1500 to 3000 pounds are commonplace in American agriculture. These bales have the ability to withstand the affects of weather and can be stored in an unsheltered location. However, the outer few inches of the bales do suffer from spoilage, and under ideal conditions, the bales should be kept out of the weather.

Efforts have been made to wrap such bales in a layer of plastic or the like. Reference is made to devices such as that disclosed in U.S. Pat. No. 4,173,112 issued Nov. 6, 1979. However, such devices have not proven to be feasible because it is very difficult to control a layer of plastic material as it departs from a roll. The plastic has a tendency to adhere to the roll and to resist separation therefrom; and the layer of plastic departing from the roll is subject to adverse movement from wind drafts and the like. Cutting of the plastic material after the wrapping operation has taken place has also presented a problem.

SUMMARY OF THE INVENTION

This invention combines with a conventional round baling machine a means for supporting a roll of plastic material. A divider plate is mounted on the frame of such a baler to facilitate separation of a single layer of plastic material from the roll of plastic material. A wind shield plate is also provided to protect the layer of departed material from air currents. A convenient cutting bar is provided to facilitate the cutting of the layer of plastic material after the wrapping operation is completed.

A motor is provided on the shaft for the roll of plastic material to provide an initial rotational surge to the roll to cause a portion of plastic material to be unrolled therefrom. The motor for providing this initial rotational surge is further provided with an overriding clutch so that the motor will not brake the rotational motion of the roll after the motor is de-energized. A brake means is provided for the shaft of the roll so that the roll will not become free wheeling as a layer of plastic is being unwound therefrom.

The principal object of this invention is to provide a method and means for facilitating the wrapping of a round bale with a layer of plastic.

A further object of this invention is to provide means for carefully handling and maintaining the layer of plastic both before, during and after the bale wrapping operations.

It is a further object of this invention to protect the wrapping material from the adverse affects of static electricity and wind drafts.

A further object of this invention is to provide a means for quickly and conveniently and adequately cutting the plastic material after the wrapping operation is completed.

A further object of this invention is to control the roll of plastic material to prevent it from free wheeling during the wrapping operation.

These and other objects will be apparent to those skilled in the art.

BRIEF DESCRIPTION OF THE DRAWINGS

FIG. 1 is a side elevational view of a round baler of conventional construction with the bale wrapping apparatus of this invention mounted thereon;

FIG. 2 is a partial sectional view at an enlarged scale of the device of FIG. 1;

FIG. 3 is a partial sectional view of the device of this invention as taken on line 3—3 of FIG. 2;

FIG. 4 is a partial sectional view of the device of this invention similar to that of FIG. 2 wherein the wrapping operation is taking place;

FIG. 5 is a schematic view of the bale and plastic material during the initial wrapping operation;

FIG. 6 is a schematic view similar to that of FIG. 5 when the plastic material has been cut;

FIG. 7 is an enlarged scale elevational view taken on line 7—7 of FIG. 3;

FIG. 8 is a partial perspective view at an enlarged scale view taken along line 8—8 of FIG. 7;

FIG. 9 is an enlarged scale sectional view taken on line 9—9 of FIG. 8;

FIG. 10 is an exploded view showing how the cutter bar severs the plastic material; and FIG. 11 is a partial perspective view of the wind shield plate.

DESCRIPTION OF THE PREFERRED EMBODIMENT

The numeral 10 generally designates a conventional round baler which is commonly pulled by farm tractor 11. Baler 10 is comprised of conventional frame 12, wheels 14, and baling chamber 16. A pickup reel 18 deposits hay on the conveyor 20 which is formed into a round bale by belt-pulley system 22.

Frame 12 has sides 24 and is conventionally provided with a horizontal grill 26 (FIG. 8) which is comprised of a horizontal pipe 28 with rearwardly extending horizontal rods 30. A conventional vertical grill 32 is provided and is comprised of horizontal pipe 34 and vertical rods 36. A forward deck 38 appears at the forward end of frame 12. The foregoing structure is conventional and does not, per se, comprise the invention herein.

A pair of arms 40 are bolted or otherwise secured to sides 24 and extend upwardly and forwardly therefrom. A shaft 42 is rotatably mounted in suitable bearings on arms 40. As shown in FIG. 3, an electric motor 44 is mounted on one of the arms. Shaft 42 is equipped with a conventional overriding clutch 46. A sprocket-belt Assembly 48 interconnects the motor 44, clutch 46, and shaft 42.

A brakepulley 50 is also mounted on shaft 42 and is equipped with a belt 52 to which is attached an elongated spring 54. As shown in FIG. 7, one end of belt 52 is secured to frame 12 and one end of the spring 54 is also secured to the frame whereby resilient tension is placed on the pulley 50. This construction prevents the shaft from free-wheeling as will be described hereafter.

A roll of plastic material 56 is placed on shaft 42. The details of placing the roll 46 on shaft 42 have not been shown, and there are many conventional means by which a roll of material can be placed upon a supporting shaft.

As seen in FIG. 2 and other figures, a layer of material 58 is adapted to depart from the roll 56. The numeral 60 designates the leading edge of the layer 58.

A divider plate 62 is secured to shaft 64 and is pivotally mounted to sides 24 of the baler. A spring 66 is secured by one end to plate 62 and is secured by the other end to frame 12 in any convenient fashion (FIG. 9) to cause the divider plate 62 to bear against the roll 56. The function of the plate 62 is to cause the layer of material 58 to separate from the roll and to not adhere thereto because of static electricity or the like.

A wind shield plate 68 is mounted on spring loaded hinges 70 which in turn are mounted on pipe 28. Any conventional spring-loaded hinge will serve to cause wind shield plate 68 to move towards roll 56 as shown in FIG. 9. A shaft 72 is mounted to the upper portion of wind shield plate 68 and a plurality of rolls 74 are mounted thereon to facilitate the contact between the plate and the roll 56.

A cutter bar 76 with a plurality of teeth 78 is mounted on hinges 80. Hinges 80 are secured to horizontal rods 30 by U-bolts 82 (FIG. 8). An arm 84 is secured to the end of cutter bar 76. Spring 86 is secured to the lower end of the arm 84. The spring extends over pipe 34 and is secured to one of the rods 30 and serves to cause the arm 84 to hold the cutter bar 76 in the horizontal position shown in FIG. 9. Cable 88 secured to the upper end of arm 84 extends to the tractor 11 and can be manually operated by the tractor operator to cause the cutter bar to move to the position shown by the dotted lines in FIG. 9 to bear against and cut the plastic material as illustrated in FIGS. 6 and 10.

In the normal operation of the device of this invention, the completed bale is formed within the bale compartment 16. The motor 44 is energized momentarily to cause the layer of plastic 58 and the leading edge 60 thereof to move to the general position shown in FIG. 2 so that it is in the path of incoming hay material moving toward the bale compartment 16. The tractor and baler 10 are moved forwardly to cause additional material to be baled to move into the baling compartment 16 whereupon the leading edge 60 of the plastic material is pulled into the baling chamber as generally illustrated in FIG. 5.

The bale 90 is thereupon rotated within the machine to pull the plastic material from the roll 56 and to wrap the plastic material around the periphery of the bale as generally illustrated in FIG. 6.

It should be noted that the motor 44 is only momentarily energized to cause the leading edge 60 to engage the incoming material to be baled. The motor can be energized in any convenient fashion and this is usually done from the operator's position on the tractor. There is no need for the motor to function while the rotated bale pulls the plastic material around the periphery thereof.

The overriding clutch 46 on shaft 42 permits the pulley and belt assembly to continue to operate even though the motor is not operating. The belt 52 exerts pressure on pulley 50 to keep the roll 56 from free-wheeling while plastic is being withdrawn from the periphery thereof.

The plate 62 serves to prevent the layer of plastic 58 from adhering to the roll and facilitates the separation of the layer from the roll. The wind deflector plate 68 serves to prevent air currents from deflecting the leading edge 60 of the layer of material 58. Without plate 68, air currents could inhibit the engagement of the leading edge 60 with the incoming layer of hay to be baled.

After the bale has been wrapped, the operator actuates the cable 88 to move the cutter bar 76 to the position of the dotted lines in FIG. 9 to effect the cutting of the plastic as illustrated in FIG. 10. The conventional twine tying operation of conventional balers whereby twine is wrapped around the completed bale (and on the outside of the plastic) is then conventionally performed.

From the foregoing, it is seen that this invention will achieve at least its stated objectives.

I claim:

1. In combination with a round bale baling machine having a frame, which supports on said frame, a baling chamber; and a wrapping device for wrapping a flexible sheet around a formed bale in said baling chamber, said wrapping device comprising, a shaft means on said frame forwardly of said baling chamber, and a roll of wrapping material on said shaft, a plate means adjacent said roll for separating a layer of said material as such layer unwinds from said roll, guide means on said frame for directing said layer to said baling chamber, cutting means for selectively cutting said layer to separate the portion of said layer in said baling chamber from said roll, power means operatively secured to said roll for providing said roll with an initial rotational motion; and said power means being an electric motor with an overriding clutch operatively imposed between said motor and said roll so that said roll can rotate when said motor is not operational.

2. The combination of claim 1 wherein brake means is secured to said shaft to prevent the free-wheeling of said roll.

3. The combination of claim 1 wherein a wind deflector plate is mounted on said frame adjacent said roll to protect said layer from wind currents.

4. The method of claim 2 wherein rotational resistance is provided to said roll of plastic material to prevent said roll from free-wheeling while said layer of plastic material is wrapped around said bale.

5. The method of claim 4 including shielding of said layer of plastic material from wind currents.

6. In combination with a round bale baling machine having a frame, which supports on said frame, a baling chamber; and a wrapping device for wrapping a flexible sheet around a formed bale in said baling chamber, said wrapping device comprising, a shaft means on said frame forwardly of said baling chamber, and a roll of wrapping material on said shaft, a plate means adjacent said roll for separating a layer of said material as such layer unwinds from said roll, guide means on said frame for directing said layer to said baling chamber, and cutting means for selectively cutting said layer to separate the portion of said layer in said baling chamber from said roll, said cutting means including a spring-loaded toothed bar, means on said frame for maintaining said toothed bar parallel to the direction of movement of said layer, and means on said frame for selectively tilting said toothed bar into cutting contact with said layer.

7. The method of wrapping a round bale in a baling machine with a layer of plastic material comprising, forming a round bale in the baling compartment of a baling machine, providing a roll of plastic material on said baling machine with an initial rotational surge to cause a layer of plastic material to emerge from said roll towards said baling compartment, actuating said baling machine to cause additional material to be baled to engage said layer of plastic material and to move said layer of plastic material into its fixed contact with said bale, releasing said roll of plastic material from said initial rotational surge after said layer of plastic material is in fixed contact with said bale, rotating said bale in said baling machine to cause said bale to pull said layer of material from said roll and to wrap the same around the outer circumference of said bale and, cutting said layer of plastic material between said bale and said roll.

8. The method of claim 7 wherein rotational resistance is provided to said roll of plastic material to prevent said roll from free-wheeling while said roll of plastic material is wrapped around said bale.

* * * * *